(12) United States Patent
Schütz et al.

(10) Patent No.: US 6,682,092 B2
(45) Date of Patent: Jan. 27, 2004

(54) VEHICLE STEERING WHEEL

(75) Inventors: Dominik Schütz, Waldaschaff (DE); John-Oliver Derrick, Hettstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 75 days.

(21) Appl. No.: 10/022,676

(22) Filed: Dec. 18, 2001

(65) Prior Publication Data

US 2002/0074781 A1 Jun. 20, 2002

(30) Foreign Application Priority Data

Dec. 20, 2000 (DE) .................................... 200 21 532 U

(51) Int. Cl.⁷ .......................... B60R 21/16; B60R 21/20
(52) U.S. Cl. ..................................... 280/731; 280/728.2
(58) Field of Search ............................. 280/731, 728.2; 74/552; 200/61.54, 61.55, 61.56

(56) References Cited

U.S. PATENT DOCUMENTS

| | | | | |
|---|---|---|---|---|
| 4,785,144 A | * | 11/1988 | Fosnaugh et al. | 200/61.55 |
| 5,350,190 A | | 9/1994 | Szigethy | |
| 5,380,037 A | * | 1/1995 | Worrell et al. | 280/728.2 |
| 5,409,256 A | * | 4/1995 | Gordon et al. | 280/728.2 |
| 5,410,114 A | * | 4/1995 | Furuie et al. | 200/61.55 |
| 5,636,858 A | * | 6/1997 | Niederman et al. | 280/728.2 |
| 5,762,359 A | * | 6/1998 | Webber et al. | 280/728.2 |
| 5,775,725 A | | 7/1998 | Hodac et al. | |
| 5,906,389 A | * | 5/1999 | Fischer | 280/728.2 |
| 5,931,492 A | | 8/1999 | Mueller et al. | |
| 6,402,193 B1 | * | 6/2002 | Fleckenstein | 280/731 |

FOREIGN PATENT DOCUMENTS

| | | |
|---|---|---|
| DE | 19503816 A1 | 8/1996 |
| DE | 10056554 A1 | 7/2001 |
| EP | 0882625 A2 | 12/1998 |
| EP | 1010589 A2 | 6/2000 |
| EP | 1020332 A2 * | 7/2000 |
| FR | 2769881 A1 | 4/1999 |

* cited by examiner

*Primary Examiner*—Paul N. Dickson
*Assistant Examiner*—Ruth Ilan
(74) *Attorney, Agent, or Firm*—Tarolli, Sundheim, Covell & Tummino L.L.P.

(57) ABSTRACT

The invention relates to a vehicle steering wheel, including comprising a skeleton, a gas bag module which is axially movably coupled with the skeleton in such a way that by pressing against the gas bag module a contact is closed for actuating a horn, and a resilient return element for the gas bag module. The gas bag module includes a gas bag with an opening edge defining an inflation opening as well as includes a flange clamping the opening edge on an inside of the gas bag for fastening the gas bag. Bearing pins are provided which directly engage the flange and which are attached to one of the skeleton and a part stationarily mounted directly to the skeleton.

5 Claims, 2 Drawing Sheets

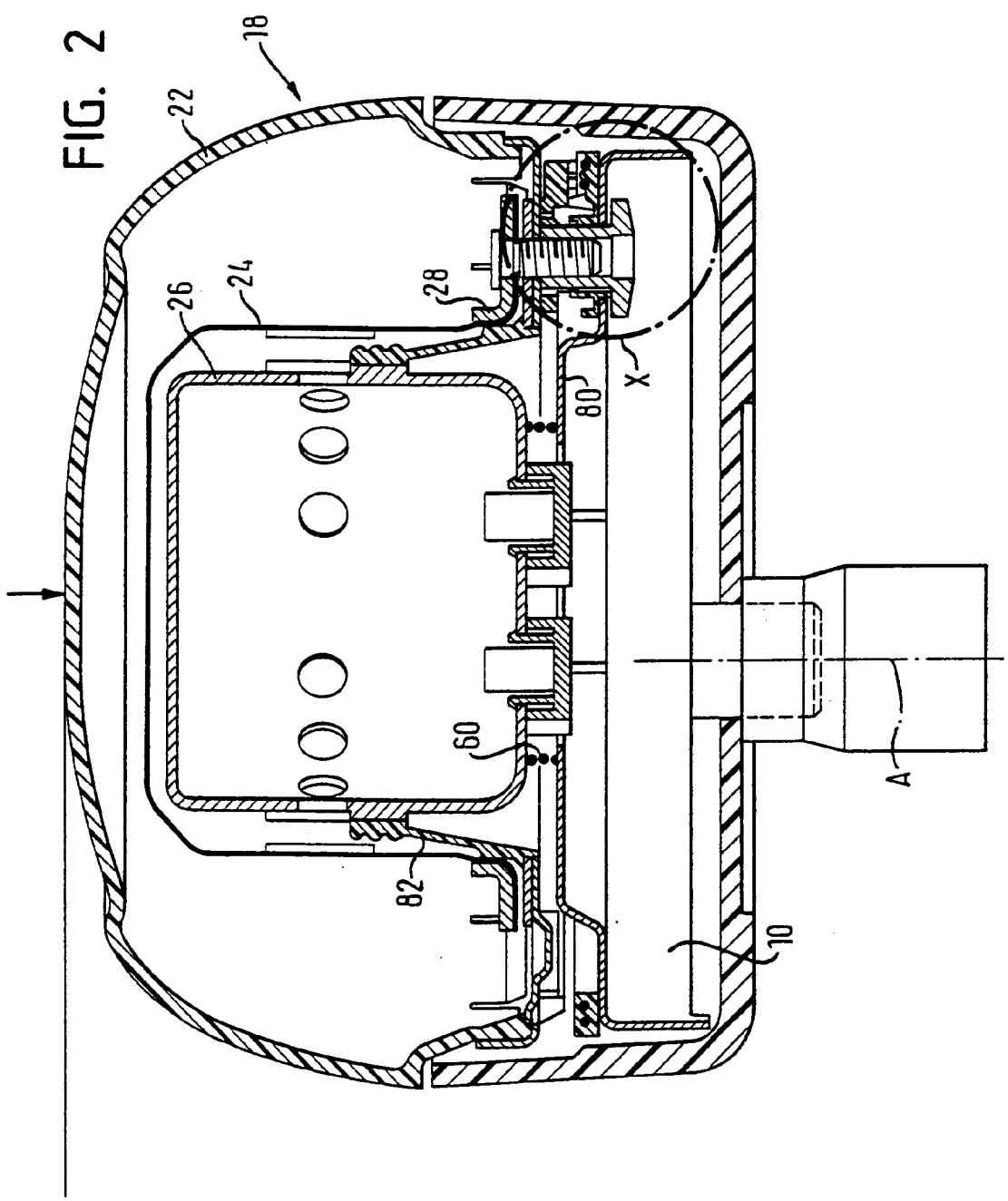

VEHICLE STEERING WHEEL

TECHNICAL FIELD

This invention relates to a vehicle steering wheel comprising a skeleton and a gas bag module which is axially movably coupled with the skeleton.

BACKGROUND OF THE INVENTION

Gas bag modules which for actuating the horn are movably mounted on the vehicle steering wheel are referred to as "floating horn" modules. Upon deployment, the gas bag must be firmly attached to the gas bag module in the vicinity of the opening edge, so as not to be torn out of the module by the thrust generated by the gas released. To this end, the gas bag is usually clamped between two metal sheets in the vicinity of the opening edge, a flange in the form of a metal ring being usually placed on the inside of the opening edge. In the prior art, this flange is urged against a flange of the gas generator, so that the gas bag is clamped between these two parts. The gas generator is attached to a gas generator mounting plate which at another point is in turn axially movably mounted on the skeleton or on a part attached to the skeleton. The individual parts should have a stable design so as to introduce the forces, for retaining the gas bag, into the skeleton.

BRIEF SUMMARY OF THE INVENTION

The invention creates a vehicle steering wheel which has less weight, is more stable and is formed of less parts than vehicle steering wheels known so far. This is achieved in a vehicle steering wheel which comprises a skeleton, a gas bag module which is axially movably coupled with the skeleton in such a way that by pressing against the gas bag module a contact is closed for actuating a horn, and a resilient return element for the gas bag module. The gas bag module comprises a gas bag with an opening edge defining an inflation opening as well as comprises a flange clamping the opening edge on an inside of the gas bag for fastening the gas bag. Bearing pins are provided which directly engage the flange and which are attached to one of the skeleton and a part stationarily mounted directly to the skeleton. In the vehicle steering wheel proposed, the force exerted on the flange is preferably directly introduced into the skeleton and not via numerous other connecting elements and parts such as the flange of the generator, a generator mounting plate and a metal sheet on the skeleton. Due to the direct introduction of force into the skeleton or into a part directly mounted on the skeleton less mounting elements are provided than in the prior art, as the load-bearing intermediate metal sheets and their attachments can be omitted.

Preferably, the bearing pins are attached to the skeleton in such a way that an axial movement of the gas bag module together with the bearing pins, for actuating the horn, is permitted. The axial mounting is thus arranged in the vicinity of the steering wheel skeleton, where more room is available than in the vicinity of the gas bag module.

Moreover, on at least one of the bearing pins one of the contacts to be closed may be mounted, so that the bearing pin together with the contact forms a preassembled unit and only few parts will have to be mounted when incorporating the gas bag module in the steering wheel.

The bearing pins can also form a lateral guidance for the gas bag module, so that further guide surfaces become superfluous.

In accordance with a preferred embodiment, the bearing pins are designed as threaded pins. Nuts screwed onto the threaded pins directly engage the skeleton or the part stationarily mounted on the skeleton. On their outer surface, the nuts have a lateral guidance for the gas bag module.

Preferably, the skeleton or the part stationarily mounted directly on the skeleton has a guide sleeve in which slides the nut.

In accordance with another embodiment a latching connection is provided by means of which said bearing pins are fixed to said skeleton. When the bearing pins are designed as threaded pins having a threaded end, a nut with an integrally formed latching nose may, for instance, be screwed onto the bearing pins each at the threaded end.

When each bearing pin is composed of several parts, for instance as threaded pin with a nut screwed onto the same, a gas generator carrier may preferably be clamped between the nut and the flange. Since the gas generator carrier need not absorb any load upon deployment of the gas bag, it may be designed as plastic part, whereby the weight of the vehicle steering wheel will be reduced. In this connection, one embodiment provides that the gas generator carrier is designed as pot-shaped housing of the gas bag module.

BRIEF DESCRIPTION OF THE DRAWINGS

FIG. 2 shows a cross-sectional view of a second embodiment of the steering wheel according to the invention.

DETAILED DESCRIPTION OF THE PREFERRED EMBODIMENTS

Figure 1:
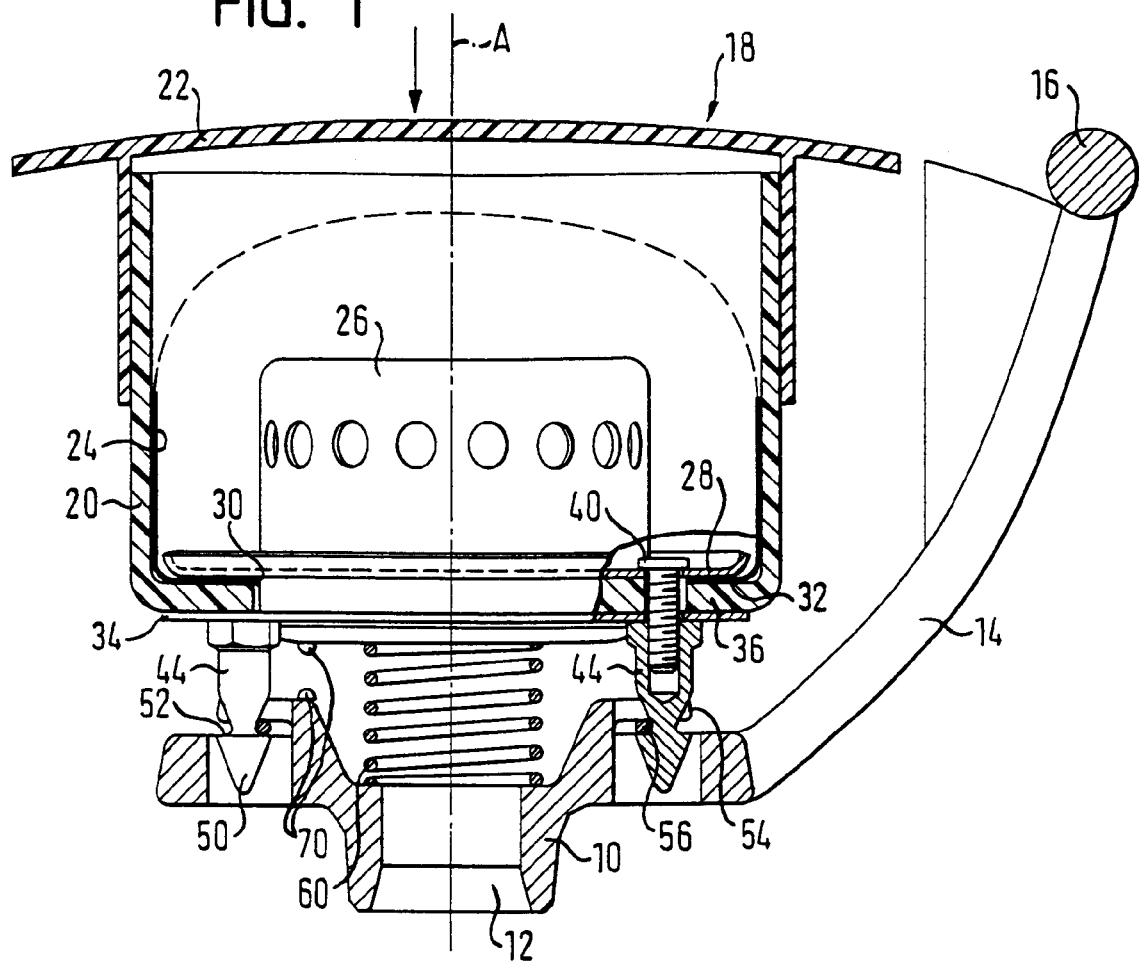
FIG. 1 shows a cross-sectional view of a first embodiment of the vehicle steering wheel according to the invention.

FIG. 1 represents a vehicle steering wheel which has a steering wheel skeleton 10, for instance of a die-cast material. In FIG. 1, only the skeleton portion in the vicinity of the hub 12 is represented. On the right-hand half, a spoke 14 and the steering-wheel rim 16 are indicated in a stylized manner. The axis A is the imaginary middle axis of the steering shaft.

A gas bag module 18 is mounted on the skeleton 10 so as to be movable in axial direction. The gas bag module has a pot-shaped plastic housing 20, also referred to as gas generator carrier, which is closed toward the occupant by a covering cap 22. Arranged in the housing 20 are a folded gas bag 24, the upper outside geometry of which is symbolized by broken lines, a gas generator 26 which protrudes into the interior of the gas bag 24, and an annular flange 28 of sheet metal. The gas bag has an opening, referred to as inflation opening 30, through which the gas generator 26 extends partly into the interior of the gas bag 24. The so-called opening edge 32 of the gas bag, which defines the inflation opening, is disposed directly below the flange 28. In the direction toward the hub 12, and below the opening edge 32 the base part 36 of the housing is disposed, and on its lower surface there is provided an annular flange 34 integrally molded on the generator 26.

Distributed around the periphery of the flange 28 merely three bearing pins 40 are directly and permanently attached by deforming these bearing pins 40. The bearing pins are designed as threaded pins and extend each through an associated opening in the opening edge 32, in the base part 36 of the housing 20 and in the annular flange 34. A nut 44 has been screwed on each threaded pin from below, so that the opening edge 32, the base part 36 and the annular flange 34 are clamped between the flange 28 and the nut 44. The gas bag 24 is in this way firmly arrested at the vehicle steering wheel. At their free ends, the nuts 44 have a latching nose 50 in the form of a conical end with an undercut portion 52, in which can snap a holding spring 56 directly mounted on an extension 54 of the skeleton 10. For mounting the gas bag module in accordance with this embodiment, the same must only be pressed in from above, until the springs 56 snap into the undercut portions 52.

In this embodiment, the force generated upon deployment of the gas bag 24 is directly introduced into the skeleton 20 via the bearing pins 40, without further intermediate metal sheets being necessary. The housing 20 and the annular flange 34 are also exposed to small loads upon deployment of the gas bag.

The gas bag module is axially movably mounted by the latching connection, a resilient return element 60 in the form of a helical spring being clamped between the lower surface of the gas bag module 18 and the upper surface of the skeleton 10.

When the gas bag module is pressed downwards, two contacts 70 (one at the gas bag module 18, one at the skeleton 10) get in contact with each other, close an electrical circuit, and a horn signal can be heard. Upon actuation of the gas bag module 18, the contact can thus be closed for actuating the horn. When the gas bag module 18 is moved downwards in the direction of the arrow, the nuts 44 move downwards, and the undercut portions 52 likewise move downwards without the holding springs 56 coming in an unlatched position. The return movement is effected by means of the return element 60.

The embodiment as shown in FIG. 2 partly corresponds to the one shown in FIG. 1, parts of an identical function being provided with the reference numerals already introduced.

In the embodiment as shown in FIG. 2, a fastening metal sheet 80 is attached to the skeleton 10 directly and not movably with respect to the same. In this embodiment, the gas generator 26 has no annular flange 34 directly mounted on it. Rather, between the gas generator 26 and the annular flange 34 a rubber sleeve 82 is provided for uncoupling the vibrations of the gas generator 26.

Figure 3:
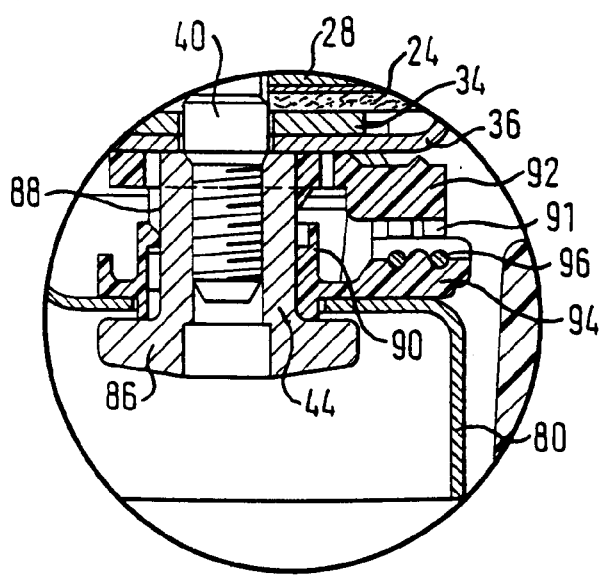
FIG. 3 shows an enlarged view of the framed portion of FIG. 2 designated with X.

In this embodiment, too, the gas bag module 18 is axially movably mounted on the skeleton 10, to be more precise on the part 80. A plurality of bearing pins 40, of which only one is shown in FIG. 3, are designed as threaded pins, which are permanently fixed in the flange 28. The bearing pins 40 extend through openings in the gas bag 24, the underlying annular flange 34 and a base part 36. The nuts 44 screwed onto the bearing pins 40 from below have a protruding head 86, which serves as axial stop, and have a bushing-like portion with a circular cylindrical outer surface which acts as lateral guidance 88 for the gas bag module 18. A guide sleeve 90 mounted in the part 80 accommodates the nut 44. Via the bearing pins 40 and the nuts 44, the gas bag module 18 is guided not only axially, but also laterally.

In this embodiment, a resilient contact 90 is mounted on the bearing pins 40, which contact is held in an elastic seat 92. To the guide sleeve 90, a counter-contact with a base portion 94 and a spring 96 is attached. When the contacts 90, 96 get in contact with each other due to the movement of the gas bag module 18 in the direction of the arrow, the horn is actuated.

The particularity of both embodiments shown is the fact that only via the bearing pins 40 individual parts inside the gas bag module 18 (gas generator with annular flange 34, gas bag 24, flange 28 and gas generator carrier 20) are attached to each other, and the entirety of the gas bag module 18 is at the same time axially movably mounted on the side of the skeleton via the bearing pins 40.

It is to be noted that the guiding nut 44 according to the second embodiment can also be used in the first embodiment where the pins being displaceably mounted to the skeleton. This third embodiment would correspond to FIG. 3 by the part 80 defining the skeleton.

What is claimed is:

1. A vehicle steering wheel comprising:

a skeleton, a gas bag module which is axially movably coupled with said skeleton in such a way that by pressing against said gas bag module a contact is closed for actuating a horn, and a resilient return element for said gas bag module, said gas bag module including a gas bag with an opening edge defining an inflation opening as well as including a flange clamping said opening edge on an inside of said gas bag for fastening said gas bag, bearing pins being provided which directly engage said flange and which are attached via a snap acting latching connection to one of said skeleton and a part stationarily mounted directly to said skeleton, said bearing pins being designed as threaded pins having a threaded end onto which a nut is screwed, said nut having an integrally molded latching nose forming a part of said latching connection.

2. The vehicle steering wheel as claimed in claim 1, wherein said bearing pins are attached to said skeleton in such a way that an axial movement of said gas bag module together with said bearing pins, for actuating said horn, is permitted.

3. The vehicle steering wheel as claimed in claim 1, wherein a gas generator carrier is clamped between said nut and said flange.

4. The vehicle steering wheel as claimed in claim 1, wherein a gas generator carrier made of plastics is provided.

5. The vehicle steering wheel as claimed in claim 1, wherein a gas generator carrier constituting a U-shaped housing of said gas bag module is provided.

* * * * *